3,172,806
PHARMACEUTICAL COMPOSITION FOR TREATING NAUSEA AND VOMITING
Arnold Koff, West Orange, and Louis Magid, Clifton, N.J., assignors to Hoffmann-La Roche Inc., Nutley, N.J., a corporation of New Jersey
No Drawing. Filed Apr. 27, 1962, Ser. No. 190,769
1 Claim. (Cl. 167—55)

The present invention relates to a pharmaceutical composition. More particularly, it relates to a pharmaceutical composition containing 4-(2-dimethylaminoethoxy)-N-(3,4,5-trimethoxybenzoyl)benzylamine and vitamin $B_6$.

The instant compositions are useful in the treatment of conditions wherein both nausea and vomiting are part of the symptoms of the condition, for example, nausea and vomiting due to infections, toxicoses, travel sickness, pregnancy, drug administration, migraine, labyrinthitis, Meniere's syndrome, psychic disturbances, etc.

It has now been found that a composition of 4-(2-dimethylaminoethoxy)-N-(3,4,5 - trimethoxybenzoyl)benzylamine with a relatively small quantity of vitamin $B_6$ when administered to pregnant women suffering from hyperemesis gravidarum is surprisingly more efficacious than 4-(2-dimethylaminoethoxy)-N-(3,4,5-trimethoxybenzoyl)benzylamine alone. Both the number of patients benefited by this therapy and the degree of benefit is significantly enhanced.

The method of treating a human being having nausea and vomiting comprises treating a human being so afflicted with a composition containing 4-(2-dimethylaminoethoxy)-N-(3,4,5-trimethoxybenzoyl)benzylamine or an acid addition salt thereof with a pharmaceutically acceptable acid and vitamin $B_6$ or an acid addition salt thereof with a pharmaceutically acceptable acid. The ratio of ingredients can vary over wide ranges, e.g., from about 106 to about 75, preferably about 4 to about 25% by weight of vitamin $B_6$ based on the weight of 4-(dimethylaminoethoxy)-N-(3,4,5-trimethoxybenzoyl)benzylamine.

The salts of 4-(2-dimethylaminoethoxy)-N-(3,4,5-trimethoxybenzoyl)benzylamine that can be employed are those salts prepared with pharmaceutically acceptable acids, e.g. HCl, HBr, $H_2SO_4$, tartaric acid, citric acid, etc., with the hydrochloride salt being preferred.

The vitamin $B_6$ can be employed as such or in the form of an acid addition salt with a pharmaceutically acceptable acid such as the above, preferably the hydrochloride. Vitamin $B_6$ is a term used to include pyridoxine and its salts, pyridoxal, and pyridoxamine, individually, or in any combination.

The compositions of the invention are prepared by mixing together the two active components and, optionally, pharmaceutical adjuvants, and forming the resulting mixtures into suitable dosage forms. Compositions suitable for oral administration are the known pharmaceutical forms for such administration, e.g. pressed or coated tablets, capsules, syrups, and aqueous solutions or oily suspensions. The pharmaceutical adjuvants used in the production of these formulations are those well known to the pharmacist's art, as are also the means of formulation. Suitable oral compositions include tablets wherein the active ingredients are mixed with inert fillers, e.g. dicalcium phosphate, terra alba, or lactose, in the presence of disintegrating agents, for example, maize starch, and in the presence of lubricating agents, for example, magnesium stearate.

Aqueous solutions for oral use are formulated by incorporating the active ingredients in pharmaceutically acceptable liquid media. The liquid media can contain, for example, a pharmaceutically acceptable thickening agent, for example, sodium carboxymethyl-cellulose, and/or pharmaceutically acceptable sweetening and flavoring agents. Oily suspensions for oral use may be formulated in a suitable vegetable oil, for example, arachis oil, which can contain suitable sweetening agents and preservatives.

Compositions suitable for parenteral administration are the known pharmaceutical forms for such administration, for example, sterile aqueous solutions or suspensions in oily media.

The sterile aqueous solutions for parenteral administration can be formulated in the presence of parenterally acceptable buffers, e.g. sodium citrate, citric acid, sodium phosphate, and/or preservatives, e.g. phenol, methyl and propyl esters of p-hydroxybenzoic acid. Suitable injectable oily preparations may be prepared by dispersing the active ingredients in an oily medium, for example, a vegetable oil, e.g. arachis oil, which is known to be non-toxic and parenterally acceptable.

The active ingredients of the invention can also be used in rectal suppository form by mixing them with suppository adjuvant materials, e.g. fatty acid esters of glycerine or glycols, e.g. cocoa butter, propylene glycol monostearate, etc., by techniques well known to the art.

A typical adult dosage of ingredients ranges from about 100 to about 600 mg. preferably about 200 to about 400 mg. of 4-(2-dimethylaminoethoxy)-N-(3,4,5-trimethoxybenzoyl)benzylamine and from about 10 to about 75, preferably about 15 to about 50 mg. of vitamin $B_6$. The quantities of ingredients employed will vary, in part, according to the formulation. For example, a sustained release tablet containing as active ingredients 300 mg. of 4 - (2 - dimethylaminoethoxy)-N-(3,4,5-trimethoxybenzoyl)benzylamine hydrochloride and 25 mg. of pyridoxine hydrochloride is administered to a patient twice daily. However, the above ranges are not critical, and dosages outside these ranges can be employed.

Preferred formulations are sustained release formulations containing from about 60 to about 140, preferably about 80 to about 120 parts of carnauba wax, from about 75 to 150, preferably about 80 to about 130 parts of zein, from about 200 to about 600, preferably about 200 to about 400 parts of 4-(2-dimethylaminoethoxy)-N-(3,4,5-trimethoxybenzoyl)benzylamine hydrochloride, and from about 10 to about 75, preferably about 15 to about 50 parts of pyridoxine hydrochloride. Other ingredients such as small quantities of talc, magnesium stearate, lubricants such as stearic acid or calcium stearate, mineral oil, and glycerides of fatty acids, etc., can also be included.

The duration of time of activity of the above sustained release formulation is in the range of about 10 to about 12 hours. This formulation removes the requirement of frequent dosage since twice-a-day dosage is sufficient. Also, the formulation acts to maintain the therapeutic effect overnight.

The following examples are given to illustrate and not to limit the invention.

*Example 1*

205 m. of 4-(2-dimethylaminoethoxy)-N-(3,4,5-trimethoxybenzoyl)benzylamine hydrochloride, 17.2 mg. of pyridoxine hydrochloride, 102 mg. of carnauba wax, 7 mg. of talc, 7 mg. of Stero-Tex,[1] and 4 mg. of magnesium stearate are blended together in a stainless steel container and are granulated with a water-isopropyl alcohol solution of 111 mg. of zein. The mixture is dried and compressed into a tablet on a rotary tablet machine.

A syrup is prepared from 150 mg. of sucrose and 131 mg. of distilled water. The syrup is applied to the above tablet in a tablet-coating basin, and the tablets allowed to dry. Then a solution of 4.3 mg. of gelatin and 116.5 mg. of sucrose in 92 mg. of distilled water is formed

[1] Stero-Tex is a powdered vegetable stearine (hydrogenated vegetable oil).

and the gelatin syrup is added to the above tablet. A dicalcium phosphate coating powder composed of 17.2 mg. of dibasic calcium phosphate, 8.9 mg. of cornstarch, 3.5 mg. of talc, 1.7 mg. of acacia, and 20 mg. of 4X sugar is prepared, and mixed with 110 mg. of 4-(2-dimethylaminoethoxy) - N-(3,4,5-trimethoxybenzoyl)benzylamine hydrochloride and 9.1 mg. of pyridoxine hydrochloride. The tablet is moistened with the gelatin syrup and the coating powder applied, followed by moistening with the syrup, etc., until all of the coating powder is on the tablet.

The tablet is then coated with a standard sugar coating using a standard coating technique.

Example 2

300 mg. of 4-(2-dimethylaminoethoxy)-N-(3,4,5-trimethoxybenzoyl)benzylamine hydrochloride, 25 mg. of pyridoxine hydrochloride, 30 mg. of cornstarch, and 15 mg. of USP magnesium stearate are mixed together in a stainless steel container, the mixture passed through a comminuting machine, and then filled into a hard-shelled gelatin capsule.

Example 3

200 mg. of 4-(2-dimethylaminoethoxy)-N-(3,4,5-trimethoxybenzoyl)benzylamine hydrochloride, 15 mg. of pyridoxine hydrochloride, 1.8 mg. of methyl-p-methoxybenzoate, 0.5 mg. of sodium citrate and 0.2 mg. of citric acid are added to 1 ml. of water. The pH of the solution is adjusted to 5.0 with hydrochloric acid. The solution is filtered and filled into a glass ampul which is sealed and heat-sterilized. The resulting aqueous solution is suitable for parenteral injection.

Example 4

400 mg. of 4-(2-dimethylaminoethoxy)-N-(3,4,5-trimethoxybenzoyl)benzylamine hydrochloride, 60 mg. of pyridoxine hydrochloride, 38.6 mg. of white beeswax, 95.8 mg. of polyoxyethylene mono-oleate (Tween 80) and 11.00 mg. of propylene glycol monostearate are mixed together, heated, and shaped in the form of a rectal suppository.

Variations of the process and compositions of the invention can be undertaken by those skilled in the art wtihout departing from the scope or spirit of the invention.

We claim:

A pharmaceutical preparation in unit dosage form comprising from about 200 to about 600 parts of 4-(2-dimethylaminoethoxy) - N - (3,4,5-trimethoxybenzoyl)benzylamine hydrochloride, from about 10 to about 75 parts of pyridoxine hydrochloride, from about 60 to about 140 parts of carnauba wax and from about 75 to about 150 parts of zein.

References Cited by the Examiner

UNITED STATES PATENTS

| 2,793,979 | 5/57 | Svedres | 167—82 |
| 2,805,977 | 9/57 | Robinson | 167—82 |
| 2,895,880 | 7/59 | Rosenthal | 167—82 |

OTHER REFERENCES

Davidson: Tenn. Medical J., vol. 53, April 1960, pages 140–142.

LEWIS GOTTS, *Primary Examiner.*

M. O. WOLK, FRANK CACCIAPAGLIA, JR.,
*Examiners.*

UNITED STATES PATENT OFFICE
CERTIFICATE OF CORRECTION

Patent No. 3,172,806                                March 9, 1965

Arnold Koff et al.

It is hereby certified that error appears in the above numbered patent requiring correction and that the said Letters Patent should read as corrected below.

Column 1, line 37, for "106" read -- 1.6 --; column 2, line 58, for "205 m." read -- 205 mg. --.

Signed and sealed this 17th day of August 1965.

(SEAL)
Attest:

ERNEST W. SWIDER
Attesting Officer

EDWARD J. BRENNER
Commissioner of Patents